(No Model.)

2 Sheets—Sheet 1.

C. W. MUSGROVE.
STATION INDICATOR.

No. 291,073. Patented Jan. 1, 1884.

WITNESSES

INVENTOR
C. W. Musgrove (No Model.)

2 Sheets—Sheet 2.

C. W. MUSGROVE.
STATION INDICATOR.

No. 291,073. Patented Jan. 1, 1884.

WITNESSES
F. A. Roepper
H. J. Tunis

INVENTOR
C. W. Musgrove
J. H. Adriaans
Attorney

N. PETERS, Photo-Lithographer, Washington, D. C.

UNITED STATES PATENT OFFICE.

CHARLES W. MUSGROVE, OF LOCK HAVEN, PENNSYLVANIA.

STATION-INDICATOR.

SPECIFICATION forming part of Letters Patent No. 291,072, dated January 1, 1884.

Application filed September 6, 1883. (No model.)

*To all whom it may concern:*

Be it known that I, CHARLES W. MUSGROVE, residing at Lock Haven, in the county of Clinton and State of Pennsylvania, have invented a new and useful Indicator, of which the following is a specification, reference being had to the accompanying drawings and the letters of reference marked thereon.

My invention relates to indicating devices; and it consists of an indicator by which the names of terminal and intermediate stations on any route are correctly exhibited in proper sequence; and the objects of my improvements are, first, to obtain within small compendium and easy operation an effective indicator; second, to permit readily of changing the direction of the indicating cloth or strip; and, third, to accomplish these ends with simplicity of construction. I attain these objects by the mechanism shown in the accompanying drawings, in which—

Figure 1:
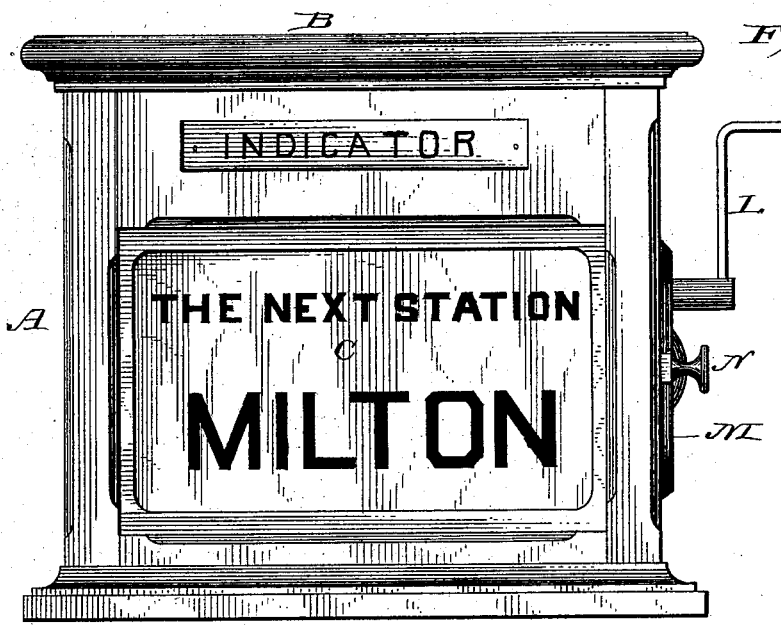
Figure 2:
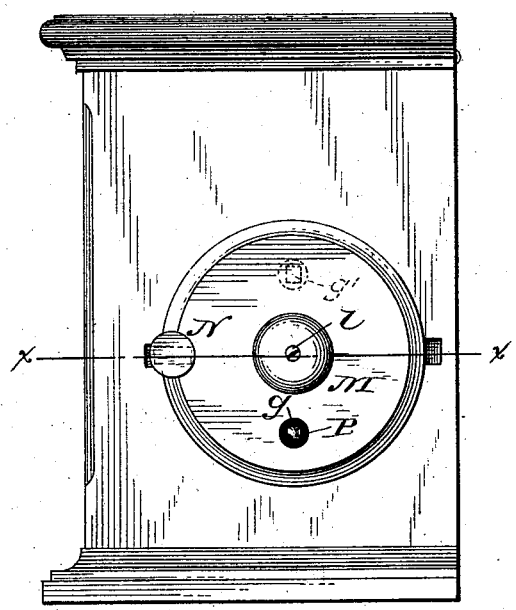
Figure 3:
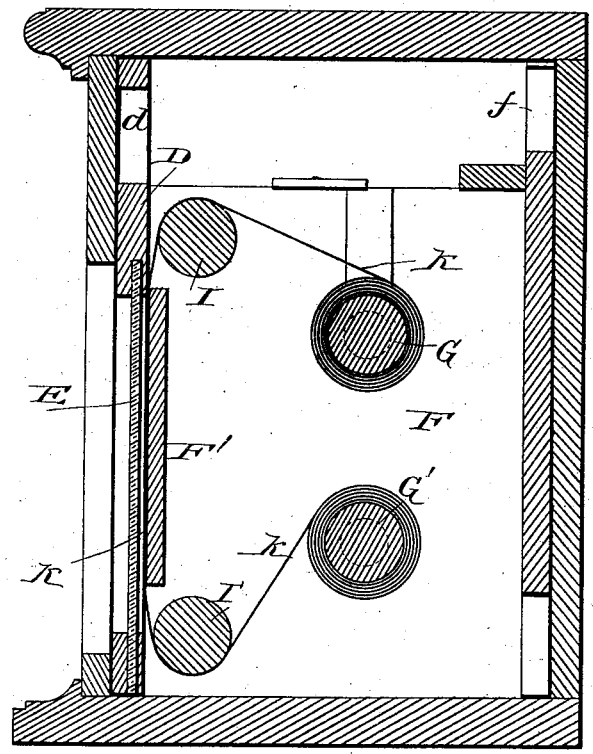
Figure 4:
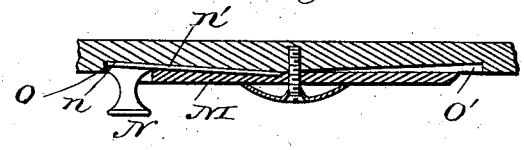

Figure 1 represents a front elevation of my invention. Fig. 2 is a side elevation thereof. Fig. 3 is a transverse section, and Fig. 4 a horizontal section through the line $x\ x$ of Fig. 2.

The same letters refer to corresponding parts.

A represents the outer casing of the device.

B is a hinged cover to the casing, which may be locked, if desired.

C represents a space cut out from the front face, to exhibit the indication.

D is a removable slide in the front of the casing, having a glass, E, fitted therein.

F is a frame containing the mechanism, removable from the casing A.

G G' are alternately receiving and delivery rollers, to which the ends of the cloth or strip K are affixed.

I I' are guide-rollers, and the front F' of the frame F performs the same function of guiding the cloth, the former operating to change the direction from an approximately horizontal to one at an angle, and the latter to conduct the cloth vertically.

K represents the cloth.

L represents the crank, by which motion is imparted alternately to the rollers G G', according as the square projection $g$ or $g'$ is exposed through the plate M, which is for this purpose rotary.

M is a plate, perforated for the insertion of the crank L, and the end $n$ of a catch, N, attached thereto, the spring $n'$ acting normally to hold the plate stationary, and the catch or lug N to serve as a means of imparting rotation to the disk or plate M. The plate is held onto the frame by a screw, $l$.

O O' are longitudinal depressions in the box, serving to detain the spring $n'$, attached to the end $n$ of the catch N, when the rotation of the plate M brings the hole therein alternately in alignment with the projection $g$ or $g'$.

$d$ is a finger-hole to remove the slide D, and $f$ performs a similar function for the frame F.

The operation is as follows: The guide-rollers G G' are removed from their bearings in the box and the respective ends of the cloth affixed thereto. The rollers are then placed in their bearings, and upon turning the crank L the cloth will exhibit behind the glass E the indications in proper sequence. When returning over the same route, it becomes simply necessary to alter the direction of the cloth by making the previous delivery-roller the receiver.

It is obvious that any indications may be upon the cloth, and that hence it may subserve any purpose in which an indicator is useful, as on street and steam railroads, elevators, steam and other boats, and various analogous objects.

Having thus fully described my invention, what I claim, and desire to secure by Letters Patent of the United States, is—

1. In combination with rollers G G', to which the ends of the indicating cloth or strip are fastened, and which successively receive and deliver it, having square projections $g\ g'$ extending therefrom, the plate M, which serves by rotation to afford access alternately to the projection $g$ or $g'$, according to the direction pursued by the cloth, for which purpose it is suitably perforated, catch N serving to reciprocate its end $n$, and hence the spring $n'$, affixed thereto, when it is desired to rotate the plate M, and crank L, by which rotation is imparted either to the projection $g$ or $g'$ on the roller G or G', according as it becomes a receiver.

2. In combination with the receiving and delivery rollers G G', guide-rollers I I', serving to change the direction of the cloth, guide-frame F', located between and in front of such rollers to guide the cloth between them, glass E, whereby the information is exposed, frame F, in which the mechanism is mounted, and which is removable from the outer casing, and cloth K, which bears the indications and is attached to both rollers G and G'.

3. In indicators, the rollers G G', having square projections q q', plate M, affording access thereto, catch N, having end n, to which is attached the inner end of a spring, n', which serves normally to hold the plate M stationary, and only permits its rotation when raised from its bed by the catch, and crank L, in combination with guide-rollers I I', guide-frame F', glass E, frame F, and cloth K.

4. In indicators, the frame A, being an outer casing for the entire device, having lid B, the removable frame F, glass E, slide D, serving to remove the glass E for cleaning and other purposes, the glass being mounted in the slide, rollers G G' I I', guide-frame F', plate M, catch N, having end n and spring n', crank L, and cloth K.

In testimony whereof I affix my signature in presence of two witnesses.

CHARLES W. MUSGROVE.

Witnesses:
F. A. ROEPPER,
H. J. ENNIS.